May 10, 1938. J. W. SCHMIDT Re. 20,722

BLADE ANCHORING WEDGE

Original Filed Nov. 30, 1936

Joseph W. Schmidt Inventor

By Wheeler, Wheeler & Wheeler

Attorneys

Reissued May 10, 1938

Re. 20,722

UNITED STATES PATENT OFFICE 20,722

BLADE ANCHORING WEDGE

Joseph W. Schmidt, Milwaukee, Wis., assignor to Wetmore Reamer Co., Milwaukee, Wis., a corporation of Wisconsin Original No. 2,096,472, dated October 19, 1937, Serial No. 113,324, November 30, 1936. Application for reissue February 12, 1938, Serial No. 190,310

5 Claims. (Cl. 29—105)

This invention relates to improvements in blade anchoring wedges. The invention has particular application to wedges for the retention of blades inserted in a reamer or other rotary cutting tool.

It is the primary object of the invention to provide a blade anchoring wedge with adjusting means which is not only adapted to seat the wedge for the retention of the tool, but is also adapted to provide support for the wedge when the wedge is free of the tool, and to release the wedge from clamping engagement with the tool and thereby to obviate the necessity for using a hammer for the release of the wedge.

More specifically, I propose to adjust the wedge in both directions by manipulation of a right and left hand screw, in threaded engagement both with the wedge and the body of the tool, whereby to accomplish the functions aforesaid.

In the drawing.

Like parts are identified by the same reference characters throughout the several views.

Figure 1:
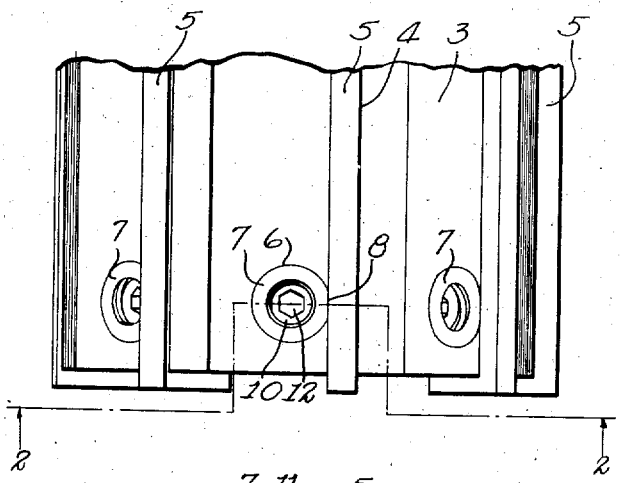
Figure 1 is a fragmentary side elevation of a rotatable cutting tool embodying the invention.
Figure 2:
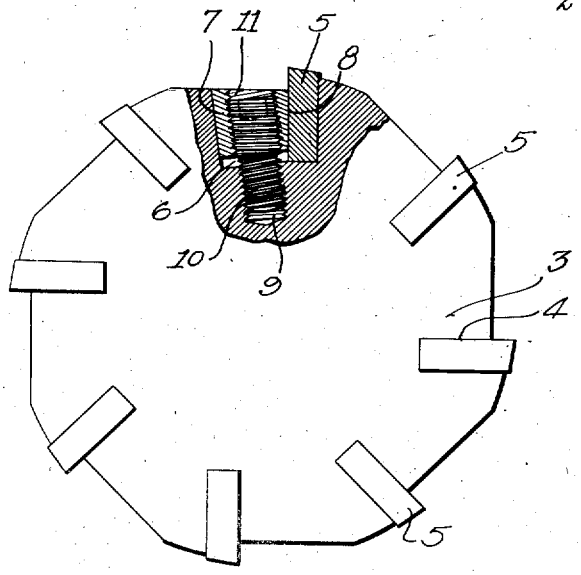
Figure 2 is an end elevation of the tool, a portion thereof being broken away to a section exposing the wedge adjusting means.

My improved tool comprises a body portion 3 having suitable slots 4 in its periphery for the reception of renewable tool blades 5.

The bores 6 intersect the slots 4 and are equipped with generally cylindrical wedge members 7, having their faces flattened at 8 for engagement with the respective tool blades 5.

From the bottom of each bore 6 there extends into the body of the tool a tapped socket 9 to receive the smaller threaded end of an adjusting screw 10. The wedge 7 has an aligned aperture 11 which is oppositely threaded to receive the larger end of the adjusting screw.

The respective ends of the adjusting screw have right and left hand threads, as illustrated. In consequence, the rotation of the screw in one direction will draw the wedge 7 downwardly into bore 6 to seat its face 8 in clamping engagement with the tool blade 5. The opposite rotation of the adjusting screw will force the wedge from its binding engagement with the tool blade and will gradually withdraw the wedge to a position where the tool may readily be removed and replaced. Even when the wedge is free of the tool it cannot fall from the bore 6, in which it operates, since the threads of the adjusting screw will remain in engagement, both with the wedge and with the tool body 3, to maintain an operative connection between these parts.

Any desired means, such as the polygonal socket 12, may be provided for the reception of a wrench suitable for the manipulation of the adjusting screw.

I claim:

1. In a device of the character described, the combination with a tool body having a longitudinal slot upon its periphery and provided with an inclined bore intersecting the slot, of a tool blade in the slot, a generally cylindrical wedge reciprocable in the bore and having one beveled face finished for clamping engagement with said blade, an adjusting screw for said wedge having right and left hand threaded portions, one of said portions being of reduced diameter as compared with the other, one of said portions being in threaded connection with the wedge, and the other being in threaded connection with said body.

2. The combination with a tool body, having a peripheral slot and provided with a wedge opening intersecting the slot and having an inclined face converging inwardly toward the slot, of a tool blade in the slot, a wedge in the opening bearing against said face and said blade, and an adjusting screw for the wedge having right and left hand threaded portions, the portion of said screw engaged in the wedge being of relatively large diameter, and a portion of said screw engaged in the tool body being of smaller diameter, the larger portion of said screw having a terminal socket adapted to receive a wrench for the manipulation of the screw.

3. An anchor wedge assembly comprising a wedge shaped anchor block having a screw threaded bore extending through the block in the direction in which its sides converge, in combination with a block anchoring screw having a first portion extending through the bore and in screw threaded engagement with the block and a second portion of reduced diameter and threaded in the opposite direction, said reduced portion being adapted to pass freely through the bore into engagement with a smaller threaded bore in a socketed support into which the wedge may be drawn with progressively increasing pressure when the screw is turned in one direction, and from which it may be forced when the screw is turned in the other direction.

4. An anchor wedge assembly comprising the combination of a wedge shaped anchor block formed for entry in a correspondingly contoured socket in a support at one side of a device to be anchored to such support, said anchor block having a bore extending through the block in the general direction of convergence of its side faces, and a screw having one portion in threaded engagement with the block within the bore and another portion of reduced diameter, adapted to pass loosely through the bore and provided with differently pitched threads for engagement in a correspondingly threaded bore in the support.

5. In a device of the character described, the combination with a body providing a seat for a part requiring to be anchored in said seat, of a wedge movable to and from anchoring pressure engagement with said part, said wedge and body having aligned apertures of different diameters and provided, respectively, with threads of differing pitch characteristics, and an adjusting screw in the aligned apertures of the body and the wedge, provided with portions of different diameters complementary to the respective apertures and having differential threads complementary to the threads of the wedge and body, respectively, the thread differential being such that in one direction of screw rotation the wedge may be drawn toward said body into retaining engagement with said part, and in the other direction of rotation the wedge may be withdrawn from said body and from retaining engagement with said part.

JOSEPH W. SCHMIDT.